US011829587B2

(12) United States Patent
Bogdanowicz et al.

(10) Patent No.: US 11,829,587 B2
(45) Date of Patent: Nov. 28, 2023

(54) INPUT DEVICE, METHOD FOR PROVIDING MOVEMENT COMMANDS TO AN ACTUATOR, AND ACTUATOR SYSTEM

(71) Applicant: Festo SE & Co. KG, Esslingen (DE)

(72) Inventors: Grzegorz Bogdanowicz, Ostfildern (DE); Elias Knubben, Kirchheim unter Teck (DE); Nadine Kärcher, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 106 days.

(21) Appl. No.: 17/611,359

(22) PCT Filed: Mar. 24, 2020

(86) PCT No.: PCT/EP2020/058092
§ 371 (c)(1),
(2) Date: Nov. 15, 2021

(87) PCT Pub. No.: WO2020/229028
PCT Pub. Date: Nov. 19, 2020

(65) Prior Publication Data
US 2022/0253186 A1    Aug. 11, 2022

(30) Foreign Application Priority Data

May 15, 2019  (DE) .......................... 102019207017.5

(51) Int. Cl.
*G06F 3/0484* (2022.01)
*B25J 9/16* (2006.01)
(Continued)

(52) U.S. Cl.
CPC .......... *G06F 3/0484* (2013.01); *B25J 9/1664* (2013.01); *G05B 19/409* (2013.01); *G05B 2219/40099* (2013.01); *G06F 3/0488* (2013.01)

(58) Field of Classification Search
CPC .... G06F 3/0484; G06F 3/0488; B25J 9/1664; B25J 9/1656; B25J 13/06; G05B 19/409; G05B 2219/40099; G05B 2219/40395
See application file for complete search history.

(56) References Cited

U.S. PATENT DOCUMENTS 6,879,862 B2    4/2005  Brown et al.
10,163,365 B2   12/2018 Sisamos
(Continued)

FOREIGN PATENT DOCUMENTS

DE    102008017289 A1    9/2009
DE    102010012598 A1    9/2011
(Continued)

*Primary Examiner* — Amit Chatly
(74) *Attorney, Agent, or Firm* — Hoffmann & Baron, LLP

(57) ABSTRACT

An input control for providing motion commands to an actuator, including an input screen on which a plurality of movement symbols are arranged, each of which is associated with a motion command for the actuator, and which includes a sequence track for lining up copies of the movement symbols along an alignment direction, having a processor which is configured to interrogate the sequence track in order to determine a sequence of motion commands and to output the sequence of motion commands and/or an actuator control signal sequence which is dependent on the sequence of motion commands, and wherein a sensor signal track is arranged in parallel with the sequence track, which is configured for displaying a sensor signal sequence of at least one sensor signal of a sensor system assigned to the actuator.

12 Claims, 4 Drawing Sheets

(51) Int. Cl.
*G05B 19/409* (2006.01)
*G06F 3/0488* (2022.01)

(56) References Cited

U.S. PATENT DOCUMENTS

| | | | |
|---|---|---|---|
| 2004/0186623 | A1 | 9/2004 | Dooley et al. |
| 2014/0277742 | A1* | 9/2014 | Wells .................... B25J 9/1612 700/264 |
| 2018/0154517 | A1 | 6/2018 | Park et al. |
| 2019/0202058 | A1* | 7/2019 | Dai ........................ B25J 9/1671 |
| 2019/0210229 | A1* | 7/2019 | Linnell ............... G06F 3/03547 |
| 2020/0361092 | A1* | 11/2020 | Zhong .................... B25J 19/023 |
| 2022/0253186 | A1* | 8/2022 | Bogdanowicz ...... G05B 19/409 |

FOREIGN PATENT DOCUMENTS

| | | | | |
|---|---|---|---|---|
| DE | 102017202439 | A1 * | 8/2018 | ............ B25J 9/1656 |
| DE | 102017202439 | A1 | 8/2018 | |
| EP | 0496785 | B1 | 3/1997 | |
| EP | 1505485 | A2 | 2/2005 | |

* cited by examiner

INPUT DEVICE, METHOD FOR PROVIDING MOVEMENT COMMANDS TO AN ACTUATOR, AND ACTUATOR SYSTEM

BACKGROUND OF THE INVENTION

The invention relates to an input control for providing motion commands to at least one actuator, having an input screen on which a plurality of movement symbols are arranged, each of which is linked with a motion command for at least one actuator, the input screen comprising a sequence track which is configured, in particular exclusively, for queuing copies of the movement symbols along a queuing direction to form a sequence of movements, having a processor which is configured to interrogate the sequence track in the alignment direction and to determine a sequence of motion commands as a function of the sequence of movements predetermined by the arrangement of the movement symbols in the sequence track, and to output the sequence of motion commands and/or an actuator control signal sequence which is dependent on the sequence of the motion commands, and having an output interface which is configured to provide the sequence of motion commands and/or the actuator control signal sequence to the at least one actuator, as is known from DE 10 2017 202 439 A1. Furthermore, the invention relates to a method for providing motion commands to at least one actuator and to an actuator system.

From DE 10 2010 012 598 A1, a process module library for programming a manipulator process is known, which comprises a plurality of parameterized process modules for executing a subprocess, wherein the process modules each comprise a plurality of basic commands of a common basic command set for executing a basic operation, wherein a process module can be linked to a further process module and/or a basic command, and wherein, during programming, a manipulator can be controlled by means of a function module of a graphical programming environment.

SUMMARY OF THE INVENTION

The task of the invention is to provide an input control, a method for providing motion commands to at least one actuator, and an actuator system that provide an increased range of operation while maintaining ease of operation for an operator.

This task is solved by an input control according to the invention. Here, it is provided that a sensor signal track is displayed on the input screen and is arranged parallel to the sequence track. The sensor signal track displays a sensor signal sequence of at least one sensor signal of a sensor system associated with the actuator, which sensor signal sequence is dependent on the sequence of motion commands and is correlated, in particular in time, with the motion commands.

With the sensor signal sequence, a user of the input control can easily check whether a physical variable determined with the aid of the sensor system and occurring at the actuator is in a meaningful relationship with the motion commands which are specified for the actuator by the copies of the movement symbols which are arranged in the sequence track.

The sensor system can be configured, for example, as an angle sensor for detecting a angle between adjacent arm sections of a robot arm, or as an acceleration sensor for detecting an acceleration of an end section of a robot arm, or as a force sensor for detecting a force acting on a robot arm, or as a current sensor or pressure sensor for detecting a supply of energy to a drive that is motion-coupled to the robot arm.

Alternatively, the sensor system can also be configured as an image sensor, so that a sequence of individual images, which depend on the sequence of motion commands, can be displayed in the sensor signal track, and these individual images can be played back as a film. The sensor system, which is configured as an image sensor, can either be assigned directly to the actuator in order to be able to document its movements as a "travelling observer", or it can be arranged away from the actuator in order to be able to document its movements as a "stationary observer". Exemplarily, the sensor system is configured as a video camera that is coupled to the input control and whose image signals are displayed in the sensor signal track.

Alternatively, the sensor system can also be configured as a sound pickup, in particular as a microphone, so that a sound signal can be represented in the sensor signal track, which depends on the sequence of the motion commands. For example, the sound signal can be used to be able to assess certain actions within the sequence of movements of the actuator, for example an insertion process of a first assembly component moved by the actuator into a second assembly component, wherein in the course of this insertion process, for example, a characteristic insertion noise occurs, provided that the insertion process was carried out properly, so that in the absence of the insertion noise or in the presence of a sufficiently large deviation between the current insertion noise and a stored insertion noise, it is possible to draw conclusions about a faulty assembly process.

Preferably, it is provided that the sensor signal track is arranged adjacent to the sequence track on the input display. Preferably it is provided that a representation for the sensor signal sequence in the sensor signal track is made in such a way that a partial area of the sensor signal sequence, which stands in a temporal connection with a motion command, which is to be led back to a copy of a movement symbol arranged in the sequence track, is scaled in to the extent of the copy of the movement symbol in the lining up direction along the sequence track. This simplifies a mental association between the sensor signal sequence and the motion commands resulting from the arrangement of copies of movement symbols in the sequence track for the user.

Regardless of the type of the sensor system, it can be provided that the at least one sensor signal sequence is not only stored in the input control, but can also be exported in a predefined data format as a data record or file in order to be able to perform an evaluation of the at least one sensor signal sequence at another location, in particular for preventive maintenance or for quality assurance purposes or for documentation purposes.

Supplementary or alternatively, it can be provided that several sensor signal sequences are combined with each other in the input control in order to generate an observer signal sequence therefrom, which is then displayed in the sensor signal track. In this case, the signals from the sensor systems associated with the actuator are combined in such a way as to generate a signal sequence that could originate from a virtual sensor. Such a virtual sensor is also referred to as an observer, and the associated signal sequence is accordingly referred to as an observer signal sequence.

Advantageous further embodiments of the invention are the subject of the subclaims.

It is expedient if the sensor signal track display is configured comparison between a stored first sensor signal track and a currently determined second sensor signal track. On the basis of this comparison between the first sensor signal sequence, which was determined during a chronologically past sequence of movements for the actuator as specified by the sequence of motion commands, and the second sensor signal sequence, which results from current sensor signals of the sensor system during the execution of the sequence of movements for the actuator specified by the sequence of motion commands, it can be easily understood by an operator whether there are possibly malfunctions at the actuator or possibly problems with a workpiece to be moved or processed by the actuator.

When using a sensor system configured as an image sensor, in particular as a video camera, provision can be made for providing a difference representation in the sensor signal track by superimposing the images of the first sensor signal track with the images of the second sensor signal track. Preferably, it is provided that deviations in the sequence of movements of the actuator are visually highlighted as a function of a deviation amount between the first and the second sensor signal track, for example by suitable colouring, in order to be able to provide the user of the input control with information in an efficient manner as to the points in the sequence of movements of the actuator at which critical situations may be present which may require an adjustment of the sequence of movements. It is particularly preferred to use a computer algorithm, also referred to as "artificial intelligence", in particular based on a neural network, for carrying out the comparison between the first sensor signal sequence and the second sensor signal sequence, which computer algorithm is preferably configured to be self-learning and which is used in particular to assess hazards for the actuator or for objects and/or persons in the vicinity of the actuator. Similarly, an evaluation of the second sensor signal sequence can also be carried out if the sensor system is configured as a sound pickup, in particular as a microphone.

In a further development of the invention, it is provided that the sensor signal track allows an input and a display of a tolerance band to be related with a stored first sensor signal track that is dependent on the sequence of motion commands By way of example, it can be provided that a user can select one or more function fields on the input screen away from the sequence track and the sensor signal track and may activate or deactivate them by the selection. With an activation of a first function field, a selection of a section of the first sensor signal track can be made, for example, for which an assignment of a tolerance band is to be made. In a subsequent step, a bandwidth of a tolerance band for the previously selected section of the first sensor signal sequence can then be made by activating a second function field. By activating a third function field, it can be determined whether the tolerance band is to be arranged symmetrically with respect to the first sensor signal sequence or whether an asymmetrical arrangement, for example with a larger tolerance bandwidth for signal values below the first sensor signal sequence or with a larger tolerance bandwidth for signal values above the first sensor signal sequence, is to be selected. It is understood that the above procedure for an input of a tolerance band to the first sensor signal sequence is purely exemplary and other procedures, such as a purely graphical input, can be performed by dragging and stretching at least one copy of the first sensor signal sequence on the touch-sensitive input screen. After completion of the input of the tolerance band, this is displayed on the input screen in relation to the first sensor signal sequence and can, for example, be used by the user during execution of a movement sequence for the actuator by additional display of the currently determined, second sensor signal sequence to determine areas in the movement sequence within which the tolerance band is exceeded.

In an alternative use of the tolerance band, it can be provided that the processor, during the execution of the sequence of movements, in addition to scanning the copies of movement symbols arranged in the sequence track, also performs a scan of the tolerance band associated with the first sensor signal sequence in order to influence the sequence of movements when a sensor signal currently determined during the execution of the sequence of movements approaches a tolerance limit of the tolerance band and thereby to avoid exceeding a tolerance limit determined by the tolerance band.

Alternatively, it can also be provided that the tolerance band is determined by a computer algorithm, which can also be referred to as "artificial intelligence", by including parameters that a user can select in advance from a parameter list. Exemplarily, the parameter list includes the available sensor signals, the motion commands derived from the movement symbols, and possibly other boundary conditions that depend, for example, on the sequence of movements to be performed with the actuator. Such boundary conditions may be, for example, a maximum acceleration for a workpiece to be moved with the actuator or a maximum duration for the execution of the sequence of movements of the actuator. After such a determination of the tolerance band, an influence by a user can then still be provided, for example in order to influence particularly critical sections of the sequence of movements and thereby obtain a user-defined version of the tolerance band.

In a further embodiment of the invention, it is provided that the processor is programmed to block an execution of a motion command when the tolerance band is exceeded by the currently determined second sensor signal sequence. In this case, the tolerance band serves as a limit value in order to prevent a continuation of the sequence of movements in the event of an overload of the actuator, as can occur in particular in the event of a collision of the actuator with an object. This discontinuation of the sequence of movements can be achieved in particular by switching off the actuator or by initiating a compensating movement or retracting movement of the actuator that can be predetermined.

It is advantageous if at least one control symbol is arranged on the input screen, which is linked to a control command for processing at least one sensor signal dependent on the sequence of motion commands, and wherein a copy of the control symbol is configured for queuing in the sequence track between copies of the movement symbols, the processor being programmed for processing the control command and for displaying a sensor signal sequence in the sensor signal track. Exemplarily, a first control symbol is configured for an activation of a display of a predetermined sensor signal track. Furthermore, a second control symbol is configured for a deactivation of the display of the predetermined sensor signal sequence. Alternatively, it can be provided that the first control symbol is configured for an activation of a monitoring of an exceeding of the tolerance band for a preselected section of the first sensor signal sequence and that the second control symbol is configured for a deactivation of the monitoring of the exceeding of the tolerance band for the preselected section of the first sensor signal sequence. In any case, the first control symbol, a copy of which may be arranged in the sequence track, serves for influencing the signal representation and/or the signal processing of at least one sensor signal sequence displayed in the sensor signal sequence track.

Preferably, it is provided that the control symbol is selected from the group: recording start for the sensor signal track, recording end for the sensor signal track, comparison start for the first and the second sensor signal track, comparison end for the first and the second sensor signal track. With a control symbol, which is represents a recording start for a sensor signal sequence and whose copy can be arranged in the sequence track for evaluation by the processor, a recording of the assigned sensor signal can be determined from a predetermined point in time during the movement sequence of the actuator. With a control symbol, which represents a recording end, the recording of the assigned sensor signal can be ended. With a control symbol that represents a comparison start for the first and the second sensor signal sequence, the processor can carry out a comparison between the first and the second sensor signal from a predefined point in time during the execution of the movement sequence for the actuator. Furthermore, it can be provided that, in the presence of a predetermined deviation between the first and the second sensor signal, a predetermined reaction of the actuator is brought about, for example a reduction of the movement speed or a retraction movement or a switch-off.

In an advantageous further embodiment of the invention, it is provided that the processor is configured for displaying a sectional enlargement of a section of the sensor signal track on the input screen, in particular away from the sequence track and/or the sensor signal track. For example, it can be provided that a user, by selecting an area of the sensor signal track, can cause an enlarged display of a predefined section or of a freely selected section of the sensor signal track as a section enlargement, in particular in a display window, which is freely movable on the input screen. Supplementary or alternatively, it can be provided that such a section enlargement, in particular in a display window freely movable on the input screen, is displayed by a copy of a movement symbol arranged in the sequence track without the intervention of a user. Preferably, a display of the section enlargement of the section of the sensor signal track is located apart from the sequence track and the sensor signal track.

It is expedient if the processor is programmed for influencing the sequence of motion commands and/or the actuator control signal sequence in dependence on a user-defined first sensor signal sequence displayed in the sensor signal track. By way of example, it may be provided that a user, after defining the sequence of movements for the actuator, which is done by arranging copies of the movement symbols in the sequence track, makes a change to the first sensor signal sequence resulting from the sequence of movements in order to thereby achieve an optimization of the sequence of movements for the actuator. Such an influence can be effected, for example, by selecting the corresponding sensor signal sequence in the sensor signal track and a subsequent manual distortion of the sensor signal sequence by the user, in particular by wiping finger movements on the input screen. The first sensor signal track can be either a recording of a real sensor signal during a real sequence of movements for the actuator or a simulation of the sensor signal during a simulated sequence of movements for the actuator. If the sensor signal sequence is, for example, a recording or a simulation of a signal of an acceleration sensor attached to a hand area of the actuator, the user can, by selecting this sensor signal sequence and making a corresponding wiping motion on the input screen, bring about a reduction of acceleration peaks in the sequence of movements and thus an equalization of the sequence of movements, purely as an example. Preferably, several recorded or simulated sensor signal sequences are displayed in the sensor signal track, so that a change in the selected sensor signal sequence leads to a corresponding influence on the other sensor signal sequences in order to visualize their change as well. This visualization is preferably based on a simulation of the sensor signal sequences of interest.

The task of the invention is solved for a method for providing motion commands to at least one actuator with the following steps: Providing a plurality of movement symbols on an input screen, each of the movement symbols being associated with at least one motion command for at least one actuator, lining up the movement symbols in a sequence track in order to determine a sequence of movements for the at least one actuator, scanning the movement symbols arranged in the sequence track with a processor, providing a sequence of motion commands as a function of the sequence of movements predetermined by the arrangement of the movement symbols in the sequence track by the processor, providing the sequence of motion commands to the at least one actuator and/or to a simulation representation of the at least one actuator, determining at least one sensor signal of a sensor system assigned to the actuator, and displaying a sensor signal sequence in a sensor signal track arranged parallel to the sequence track with a temporally predetermined, in particular synchronous, assignment to the sensor signals arranged in the sequence track.

In an advantageous further development of the method, it is provided that a display is made in the sensor signal track of a comparison of a stored first sensor signal sequence with a currently determined second sensor signal sequence.

The invention further relates to an actuator system comprising an input control according to the invention and an actuator configured to perform a sequence of movements in dependence on motion commands provided by a method according to the invention.

BRIEF DESCRIPTION OF THE DRAWINGS

An advantageous embodiment of the invention is shown in the drawing. Hereby shows.

DETAILED DESCRIPTION

Figure 1:
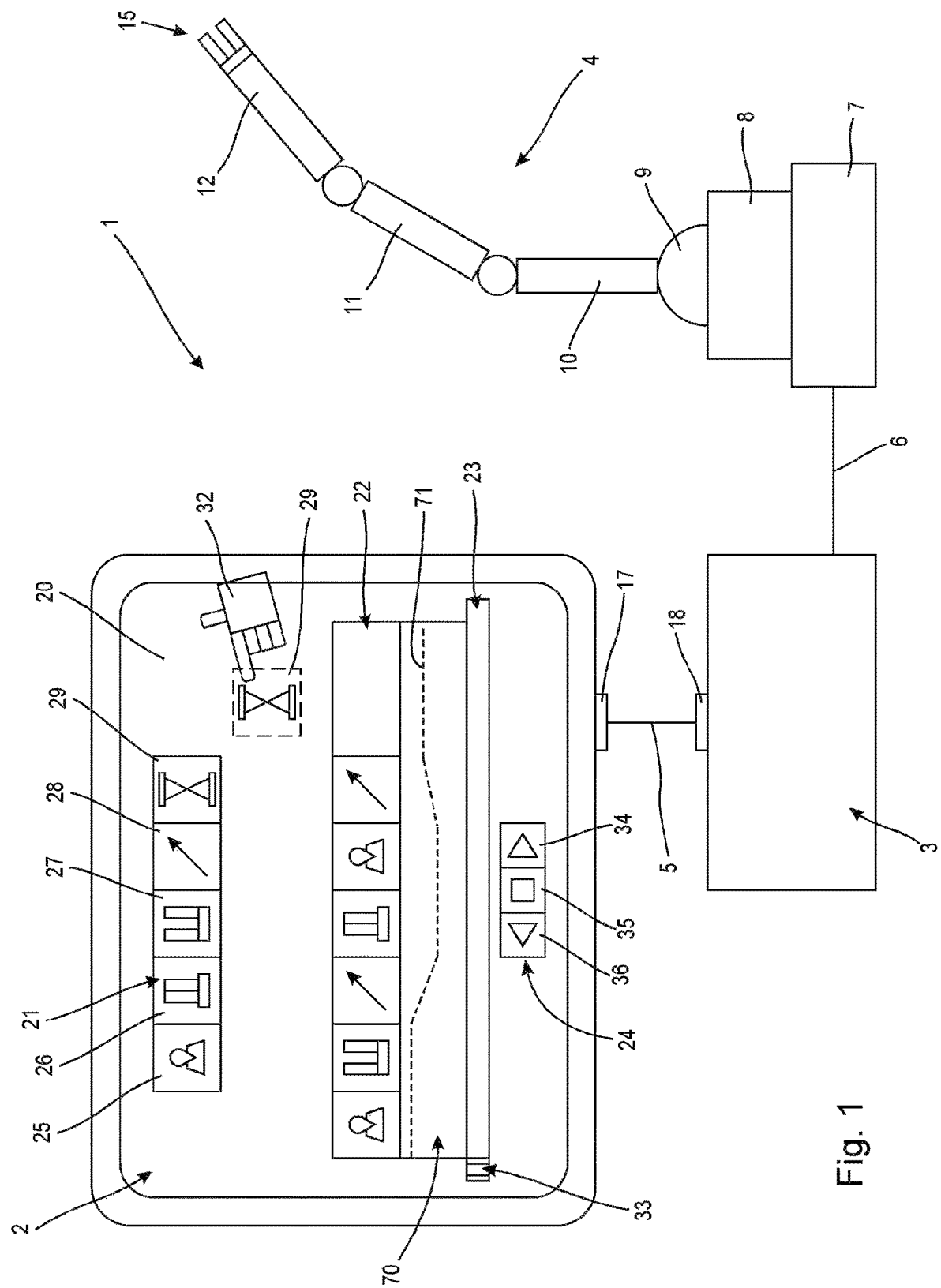
FIG. 1 a purely schematic representation of an actuator system with an input control, an actuator control and an actuator, FIG. 2 a detailed representation of the input control, FIG. 3 a representation of a multifunctional input mask of the input control, FIG. 4 an exemplary representation of an input field for the determination of a condition, which is related with a movement symbol, and FIG. 5 a detailed representation of the input control in an additional operating configuration.

An actuator system 1 shown purely by way of example in FIG. 1 comprises an input control 2 which is configured, by way of example, as a tablet computer and is connected to an actuator controller 3, the actuator controller 3 in turn being connected to an actuator 4 which is configured, by way of example, as a multi-joint robot. Alternatively, the actuator can also be configured in a manner not shown as a handling device, in particular as an H-gantry, or as a tripod or as a modification thereof, or as a flexible-elastic gripper arm or in another manner for handling objects. According to the representation of FIG. 1, a connecting cable 5, 6 is provided between the input control 2 and the actuator control 3 as well as between the actuator control 3 and the actuator 4 in order to enable a transmission of information between the respective components. Purely by way of example, an output interface 17 of the input control 2 is configured as an Ethernet or USB interface (universal serial bus) and is connected to a correspondingly configured input interface 18 on the actuator control 3 by means of the connecting cable 5.

In an embodiment of an actuator system not shown in more detail, wireless coupling is provided between the input control and the actuator controller and between the actuator controller and the actuator.

Exemplarily, the actuator 4 shown only schematically is a pneumatically operable multi-joint robot, wherein a design of this actuator 4 with regard to the mass of the moving parts of the actuator 4, the maximum force that can be exerted by the actuator 4 and the maximum speed of movement of the actuator 4 is selected such that the actuator 4 can be operated in direct cooperation with a worker without the actuator 4 causing a hazard to the worker. Alternatively, the actuator could also be provided with electric drives or with hydraulic drives or with a combination of electric and/or hydraulic and/or pneumatic drives. Purely by way of example, the actuator 4 has a base part 7 on which a rotary table 8 is mounted so as to be rotatable about a vertically aligned axis of rotation, which is not shown, and on which a swivel joint 9 is formed. An arm part 10 is movably accommodated on the swivel joint 9 and is pivotably connected to an arm part 11, which in turn is pivotably coupled to an arm part 12. The arm part 12 carries a linear gripper 15 at its end, which is shown in an open position purely as an example. Exemplarily, it is provided that between the base part 7 and the turntable 8 as well as between the swivel joint 9 and the respective arm parts 10, 11 and 12 as well as at the linear gripper 15, a pneumatic drive (not shown in more detail) is arranged, which enables a relative movement of the respective components with respect to each other.

The compressed air flows which are required to move the respective pneumatic drives, which are not shown in greater detail, are provided via the actuator control 3, which is purely exemplarily an arrangement of a plurality of electropneumatic control valves which are actuated in a manner not shown in greater detail by a control associated with the actuator control 3. The control is in particular a microprocessor with associated electrical output stages, wherein a predetermined program runs on the microprocessor, with the aid of which the respective electrical output stages can be controlled in order to be able to provide suitable electrical control currents to the respective electropneumatic control valves, so that these can provide corresponding compressed air currents to the respective pneumatic drives.

A programming of the microprocessor is carried out by means of the input control 2, which is configured purely exemplarily as a tablet computer with a touch-sensitive screen 20 and on which a program runs that enables a user to program the sequence of movements for the actuator 4 in a simple and intuitive manner.

Figure 2:
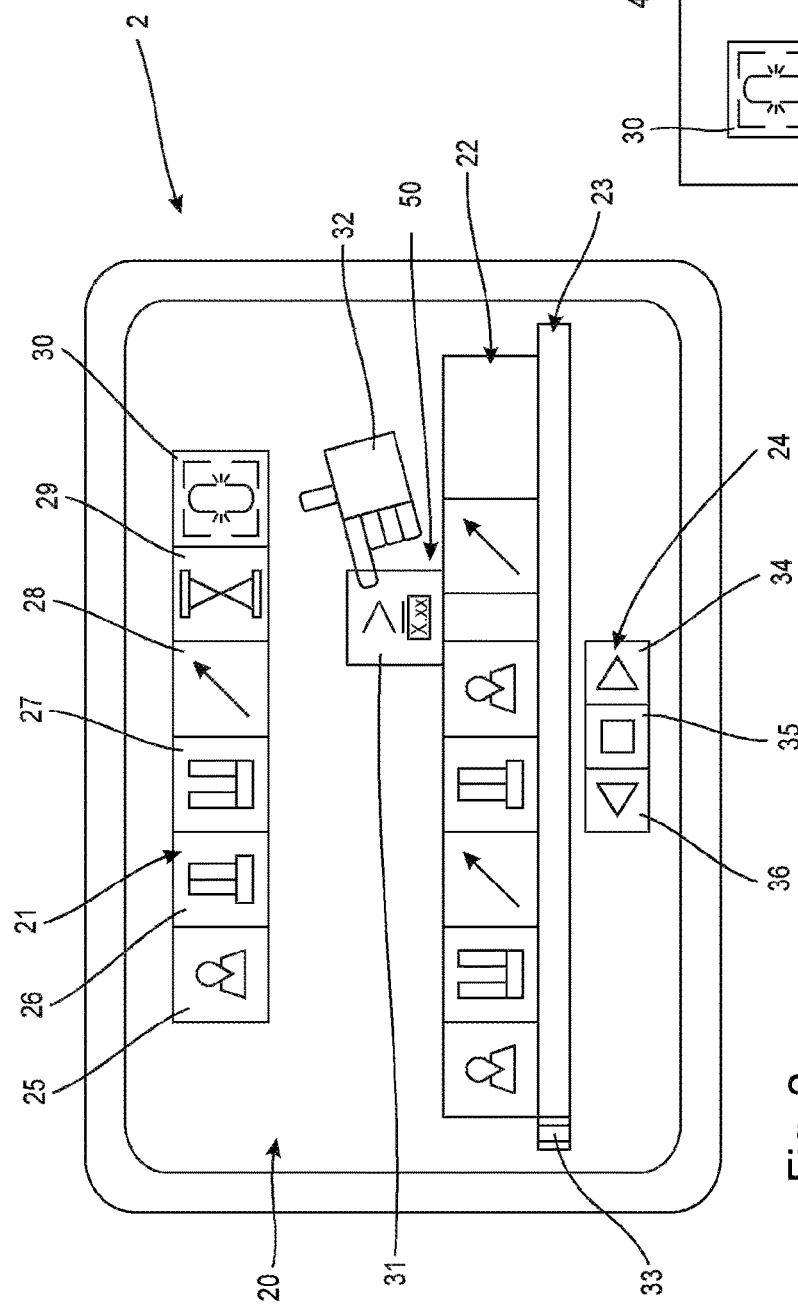
Figure 3:
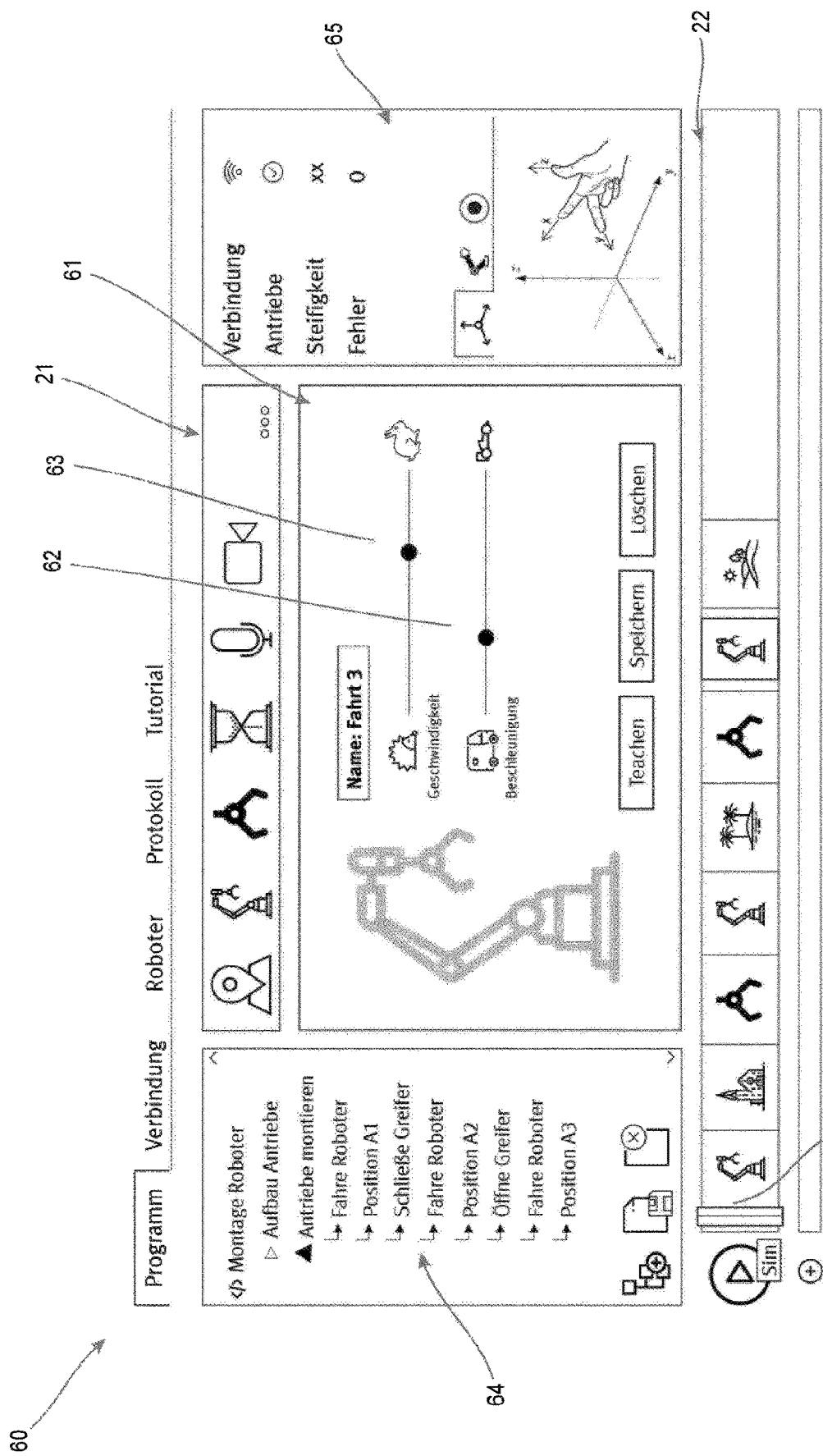

In the embodiment of the input control 2 shown in FIGS. 1 to 3, the screen contents that are displayed on the screen 20 can be freely selected within the scope of the graphical display options of the input control 2, which is configured as a tablet computer. Purely by way of example, the screen 20 is divided into a plurality of functional areas at 21, 22, 23 and 24, the function of which is described in more detail below.

In the function area 21, several movement symbols 25, 26, 27, 28 and 29 are shown, which can be selected individually by an operator symbolically represented as operator hand 32 by touching with the finger that screen area in which the respective movement symbol 25 to 29 is shown. Exemplarily, it can be provided that this touch leads to a graphic and/or acoustic and/or haptic feedback, so that the operator is informed that a copy has been made of the respective movement symbol 25 to 29, which can subsequently be moved into the function area 22 by a sliding movement of the finger over the screen 20. The function area 22 is configured as a sequence track in which an exclusively sequential stringing together of movement symbols 25 to 29 can be carried out. Purely by way of example, it is provided that the movement symbols 25 to 29 arranged in the sequence track are scanned by a processor, in particular a microprocessor of the input control 2, with a scanning direction oriented from left to right, and the motion command linked with the respective movement symbol 25 to 29 can be linked with motion commands of the upstream and downstream movement symbols 25 to 29 to form a sequence of motion commands Optionally, it may be provided that a number of movement symbols 25 to 29 that can be arranged in the sequence track is limited or no limit is provided for this purpose.

The function area 23 below the function area 22 comprises a graphical representation of a slider 33 which can be selected by the operator and can be moved along the sequence track to of the function area 22, wherein the respective motion commands associated with the movement symbols 25 to 29 arranged in the sequence track are output either from the input control 2 to the actuator control 3, in order to carry out an actual movement of the actuator 4 or are processed within the input control 2 to form a simulation which can be displayed in a manner not shown in greater detail on the screen 20 as a graphical representation of the actuator 4.

By way of example, a further functional area 24 is arranged below the functional area 23, which has a forward key 34, a stop key 35 and a rewind key 36 in a manner reminiscent of a device or program for playing music titles or films, wherein the sequence of motion commands, as represented by the movement symbols 25 to 29 in the sequence track, can be started in a forward direction or a reverse direction with these keys 34 to 36 or stopped with the stop key 35.

Purely by way of example, the movement symbols 25 to 29 are assigned the functions described in more detail below: the movement symbol 25 represents a point in space to be piloted by a tool center point (TCP—tool center point) of the actuator 4, the movement symbol 26 represents a closing movement for the linear gripper 15, the movement symbol 27 represents an opening movement for the linear gripper 15, the movement symbol 28 represents a movement for the actuator 4, and the movement symbol 29 represents a waiting phase for the actuator 4.

The movement symbols 25 to 29 can only be lined up sequentially in the sequence track of the function area 22, whereby the input control 2 can be set up in such a way that only certain combinations of movement symbols 25 to 29 can be lined up. By way of example, it can be provided that the microprocessor as well as the software of the input control 2 running thereon are configured to prevent a stringing together of two movement symbols 25 representing different tool center points or a stringing together of two movement symbols 28 each representing a movement for the actuator 4.

In the purely exemplary sequence of movement symbols 25 to 29 shown in the sequence track according to FIG. 1, a tool center point is specified at a first position with the movement symbol 25, and furthermore an opening of the linear gripper 15 is specified at the second position with the movement symbol 27. Subsequently, the movement symbol 28 arranged at the third position causes the actuator 4 to move to the specified tool center point. After reaching the tool center point, a closing movement for the linear gripper 15 is effected by the movement symbol 26 arranged at the fourth position. This is followed by the specification of a new tool center point with the movement symbol 25 arranged at the fifth position, which is approached by the actuator 4 according to the movement symbol 28 provided at the sixth position.

Optionally, it can be provided that the actuator 4 immediately executes the respective action defined by the arrangement of one or more of the movement symbols 25 to 29 in the functional area 22 or that the actuator 4 executes the actions only when the operator releases the execution of the respective actions by means of the slider 33 arranged in the functional area 23 or by means of the start-stop keys 34, 35, and 36 arranged in the functional area 24.

For this execution of actions of the actuator 4, the input control 2 is configured to bring the motion commands assigned to the respective movement symbols 25 to 29, which are not shown, into a sequence of motion commands which is subsequently provided to the actuator control 3, where a conversion of the motion commands into control signals for the electropneumatic control valves, which are not shown in more detail, takes place, which control valves provide the compressed air flows to the pneumatic drives of the actuator 4, which are not shown in more detail.

Purely by way of example, it is provided that the operator can also move the movement symbols 25 to 29 temporarily arranged in the sequence track of the functional area within the sequence track by selecting the respective movement symbol 25 to 29 or delete it by removing it from the sequence track.

Furthermore, it may be provided that the operator can combine a group of movement symbols 25 to 29 arranged in the sequence track of the functional area 22 into a motion group and can assign a new movement symbol 31 to this motion group, which can be taken from a library of movement symbols, for example. Supplementary or alternatively, it may be provided that the library of movement symbols already comprises different motion groups, which have been provided with corresponding movement symbols and which can be arranged by the operator in the same way as the movement symbols 25 to 29 in the functional area 22.

Furthermore, it can also be provided that movement symbols from the library of movement symbols are also arranged in the functional area 21, as this is shown purely as an example in FIG. 2. Movement symbols arranged there are then available for multiple use in a simple manner.

By way of example, a function area 70 serving as a sensor signal track is arranged between the function area 22 serving as a sequence track and the function area 23 serving as a slide control, which is configured to display a sensor signal sequence 71 shown purely by way of example. The sensor signal track 71 indicates only exemplarily and strictly schematically the pressure signal sequence for a pneumatic actuator, which is arranged in particular between the arm part 10 and the arm part 11 and which pneumatic actuator can cause a pivoting movement of the arm part 11 relative to the arm part 10.

The sensor signal sequence 71 results, by way of example, from a recording of a sensor signal of a pressure sensor not shown in more detail, which provides this sensor signal in a manner not shown in more detail to the processor of the input control, which is also not shown. There, processing of the sensor signal and the conversion into the graphical representation of the sensor signal sequence 71 takes place. Exemplarily, it is provided that the pneumatic actuator is first supplied with a high pressure, which is held until the movement to the first tool center point represented by the first movement symbol 28 is initiated, with a reduction of the pressure for the pneumatic actuator taking place for this purpose. Subsequently, the reduced pressure is maintained until the movement represented by the second movement symbol 28 to the second tool center point is initiated, with a slight increase in the pressure for the pneumatic actuator for this purpose.

It is decisive that in the representation on the touch-sensitive screen 20 of the input control 2, the sensor signal sequence 71 is assigned to the movement symbols 25 to 30 in a correct scale with regard to the time axis running in the horizontal direction. This always provides the operator with the temporal relationship between the respective active movement symbol and the sensor signal sequence 71.

In the case of the purely exemplary movement symbol 30 shown in FIG. 2, which can be selected from the library of motion commands (not shown in more detail) and arranged in the functional area 21, the stored motion command is configured as a condition. If the user decides to select the movement symbol 30, an input window 40 shown by way of example in FIG. 4 opens on the screen 20, in which more detailed information for the condition can be entered. Exemplarily it is provided that in the input window 40 allows a selection of a source for a value to be monitored in a selection window 41. This source can, for example, be a sensor which provides a sensor value. Furthermore, a selection window 42 can be used to specify a value to be used as a threshold value. Furthermore, a selection of logical operations 43 to 48 is given in the input window 40, with which a relationship between the threshold value and the sensor value can be established and which thus determine the condition.

Figure 4:
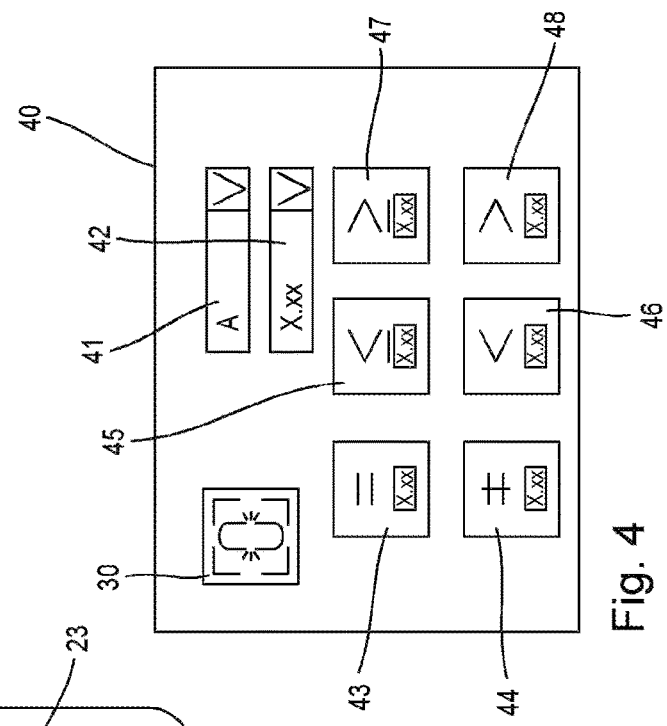

As can be seen from the representation of FIG. 2, after selecting the movement symbol 30 by selection in the input window 40 according to FIG. 4, the operator has decided in favour of a certain condition, whereby the movement symbol 30 is shown purely by way of example in a modified representation as a movement symbol 31 on the screen 20 and is now available for queuing in the function area 22. For the purpose of explaining the operation of the condition represented by the movement symbol 31 as well as the linkage of this movement symbol 31 with further movement symbols 25 to 29, it is assumed that the user has selected a certain sensor signal in the input window 40 and has specified a threshold value and a logical operation for this sensor signal. Exemplarily, it is assumed that the condition of the movement symbol 31 is met if the magnitude of the sensor signal is greater than or equal to the selected threshold value.

Exemplarily, in the embodiment of FIG. 2, the arrangement of the movement symbol 31 is possible in an additional functional area 50, which is formed as a secondary track to the functional area 22. By arranging the movement symbol 31 in the functional area 50, an existing linkage of adjacently arranged movement symbols 25 to 29, exemplarily of the to movement symbols 26 and 28, is first dissolved and then re-established with the interposition of the condition defined in the movement symbol 31. In order to make the linking of the three movement symbols 26, 31 and 28 easily comprehensible for the user, exemplary provision can be made for the movement symbol 31 to remain arranged in the secondary track of the functional area 50 and for the two movement symbols 26 and 28 to assume a distance from one another.

By the arrangement of the movement symbol 31 and the linkage with the two movement symbols 26 and 28, after the closing of the linear gripper 15, thereby the movement symbol 26 is represented, first a check of the condition represented in the movement symbol 31 takes place, which can be selected for example in such a way that a monitoring of a gripping force of the linear gripper 15 by means of a sensor (not shown in more detail) takes place and a movement, which is represented by the movement symbol 28, is carried out only if the condition is fulfilled that the gripping force reaches or exceeds a threshold value deposited in the movement symbol 31.

From the illustration of FIG. 3, a practical implementation of a user interface 60 is shown purely as an example, as it can also be displayed on the screen 20 of the input control 2 and in which the principles according to the above-discussed FIGS. 1, 2 and 4 are applied. Further, in the case of the user interface 60, additional information is displayed on the screen 20. Consistent with FIGS. 1, 2 and 4, the user interface 60 also has functional areas 21 and 22. Furthermore, an additional function area 61 is arranged between the function area 21 and the function area 22, in which individual settings can be made for the movement symbol that is currently selected with the slider 33 directly assigned to the function area 22 by way of example. Purely by way of example, settings for a movement speed and an acceleration of the actuator 4 can be made in the function area 61; corresponding sliders 62, 63 are arranged in the function area 61 for this purpose. For other movement symbols arranged in the function area 22, which can also be selected with the slider 33, other settings may have to be provided. Adjacent to the function area 61, in the input control 2 according to FIG. 3, purely by way of example, a text display of the movement symbols arranged in the function area 22 is provided on the left side in the function area 64, and an arrangement of several status displays, for example for a wireless communication connection, as well as a graphic visualization of the tool center point are provided on the right side in the function area 65.

Figure 5:
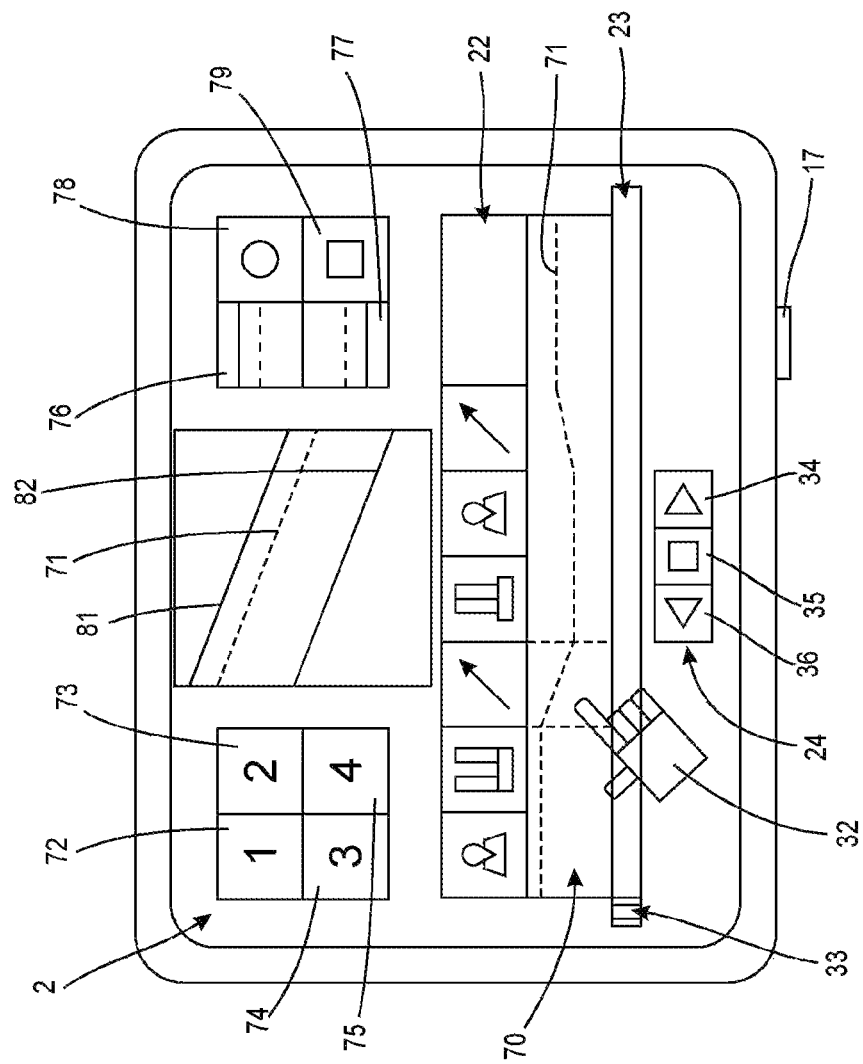

FIG. 5 shows a configuration of the screen 20 of the input control 2 resulting from a user input starting from the configuration of the screen 20 according to FIG. 1. By way of example, it is provided that when the operator hand 32 touches the functional area 70 in the form of a sensor signal track, the movement symbols 25 to 29 shown in FIG. 1 are blanked out and a functional area 80 is displayed in this area of the screen 20, which is, by way of example, a sectional enlargement of that area of the functional area 70 in the form of a sensor signal track which was selected by the operator hand 32. Purely exemplarily it is provided that in the function area 80 that section of the sensor signal sequence 71 is shown enlarged which is assigned to the assigned movement symbol 25 to 30 in the function area 22 arranged above the function mode 70 and configured as a sequence track. Furthermore, it can be provided that, in addition to the function area 80, further function areas 72 to 79 related to the sensor signal sequence 71 are displayed on the screen. Exemplary it is provided that with the help of a selection of the functional areas 72 to 75 a selection can be made, which sensor signal(s) is/are to be displayed in the function area 70 serving as sensor signal track. Furthermore, by selecting the function area 76, an upper tolerance value curve 81 can be activated for the sensor signal sequence 71. By way of example, it is provided that, when the function area 76 is selected, an upper tolerance value curve 81 is first calculated at a fixed distance from the sensor signal track 71 and is displayed in the detail enlargement of the function area 80. Subsequently, the user can select the upper tolerance value curve 81 in the detail enlargement of the functional area 80 and adjust it in the desired manner by dragging and/or moving it. Similarly, by selecting the option area 77, the user can activate and then manipulate a lower tolerance value enlargement 82. Preferably, it is provided that the user can also select and subsequently manipulate the sensor signal sequence 71 either in the function area 70 or in the function area 80 in order to be able to, for example, influence a movement speed, a minimum acceleration, a maximum acceleration or other movement-related sensor signal sequences 71 determined by sensor systems not shown, and thus to be able to influence the behaviour of the actuator 4 in a desired manner.

Similar with a music recording device, the further functional areas 78 and 79 are to be understood as a recording start button (functional mode 78) and a recording end button (functional area 79). Copies of these functional areas 78, 79 can be inserted in the manner of movement symbols in the functional area 22 formed as a sequence track, for example, to start a recording of a sensor signal sequence 71 before a movement of the actuator 4 and to end it after a movement of the actuator 4.

In an embodiment of the input control not shown, a window area, preferably freely displaceable, is provided in which a representation, in particular generated by simulation, of the actuator in its movement position dependent on the movement symbols and the motion commands derived therefrom is displayed.

Supplementary or alternatively, it can be provided that camera images of a sensor system configured as an image sensor, each linked to the movement symbols, are displayed in the sensor signal track.

The invention claimed is:
1. An input control for providing motion commands to at least one actuator, comprising an input screen on which a plurality of movement symbols are arranged, each of which is linked to a motion command for at least one actuator, the input screen comprising a sequence track for lining up copies of the movement symbols along a line-up direction to form a sequence of movements, further comprising a processor which is configured to interrogate the sequence track in the line-up direction and to determine a sequence of motion commands as a function of the sequence of movements determined by the arrangement of the movement symbols in the line-up direction, in the sequence track and for outputting the sequence of motion commands and/or an actuator control signal sequence dependent on the sequence of motion commands, and comprising an output interface which is configured to provide the sequence of motion commands and/or the actuator control signal sequence to the at least one actuator wherein a sensor signal track is arranged parallel to the sequence track, which sensor signal track is configured to represent a sensor signal sequence of at least one sensor signal of a sensor system associated with the actuator, which sensor signal is dependent on the sequence of motion commands, wherein the sensor signal track is configured for a representation of a comparison between a stored first sensor signal track which is dependent on the sequence of motion commands and a currently determined second sensor signal track which is dependent on the sequence of motion commands.

2. The input control according to claim 1, wherein at least one control symbol is arranged on the input screen, which control symbol is associated with a control command for processing at least one sensor signal dependent on the sequence of motion commands, and wherein a copy of the control symbol is adapted to be arranged in the sequence track between copies of the movement symbols, wherein the processor is adapted to process the control command and to display a sensor signal sequence in the sensor signal track.

3. The input control according to claim 2, wherein the control symbol is selected from the group: recording start for the sensor signal track, recording end for the sensor signal track, comparison start for the first and second sensor signal track, comparison end for the first and second sensor signal track.

4. The input control according to claim 1, wherein the processor enables displaying of a section enlargement of a section of the sensor signal track on the input screen.

5. The input control according to claim 1, wherein the processor is configured for influencing the sequence of motion commands and/or the actuator control signal sequence in dependence on a user-defined first sensor signal track which is displayed in the sensor signal track.

6. An input control for providing motion commands to at least one actuator, comprising an input screen on which a plurality of movement symbols are arranged, each of which is linked to a motion command for at least one actuator, the input screen comprising a sequence track for lining up copies of the movement symbols along a line-up direction to form a sequence of movements, further comprising a processor which is configured to interrogate the sequence track in the line-up direction and to determine a sequence of motion commands as a function of the sequence of movements determined by the arrangement of the movement symbols in the line-up direction, in the sequence track and for outputting the sequence of motion commands and/or an actuator control signal sequence dependent on the sequence of motion commands, and comprising an output interface which is configured to provide the sequence of motion commands and/or the actuator control signal sequence to the at least one actuator wherein a sensor signal track is arranged parallel to the sequence track, which sensor signal track is configured to represent a sensor signal sequence of at least one sensor signal of a sensor system associated with the actuator, which sensor signal is dependent on the sequence of motion commands,
wherein the sensor signal track is configured for adding and displaying of a tolerance band to a stored first sensor signal sequence.

7. The input control according to claim 6, wherein the processor is programmed to block an execution of a motion command when the tolerance band is exceeded by a currently determined second sensor signal sequence that is dependent on the sequence of motion commands.

8. The input control according to claim 6, wherein at least one control symbol is arranged on the input screen, which control symbol is associated with a control command for processing at least one sensor signal dependent on the sequence of motion commands, and wherein a copy of the control symbol is adapted to be arranged in the sequence track between copies of the movement symbols, wherein the processor is adapted to process the control command and to display a sensor signal sequence in the sensor signal track.

9. The input control according to claim 8, wherein the control symbol is selected from the group: recording start for the sensor signal track, recording end for the sensor signal track, comparison start for the first and second sensor signal track, comparison end for the first and second sensor signal track.

10. The input control according to claim 6, wherein the processor enables displaying of a section enlargement of a section of the sensor signal track on the input screen.

11. The input control according to claim 6, wherein the processor is configured for influencing the sequence of motion commands and/or the actuator control signal sequence in dependence on a user-defined first sensor signal track which is displayed in the sensor signal track.

12. A method for providing motion commands to at least one actuator, comprising the steps of:
providing a plurality of movement symbols on an input screen, each of the movement symbols being assigned a motion command for the actuator;
lining up the movement symbols in a sequence track, in order to determine a movement sequence for the at least one actuator;
scanning the movement symbols which are arranged in the sequence track with a processor;
providing a sequence of motion commands as a function of the movement symbols determined by the arrangement of the movement symbols in the sequence track;
providing the sequence of motion commands to the actuator and/or to a simulation representation of the actuator;
determining a sensor signal of a sensor system assigned to the actuator; and
displaying a sensor signal sequence in a sensor signal track arranged parallel to the sequence track on the input screen with a temporally predetermined, assignment to the movement symbols arranged in the sequence track,
wherein a comparison of a stored first sensor signal sequence with a currently determined second sensor signal sequence, is displayed in the sensor signal track.

* * * * *